(12) United States Patent
Slager et al.

(10) Patent No.: US 11,484,858 B2
(45) Date of Patent: *Nov. 1, 2022

(54) SYSTEM TO CONVERT CELLULOSIC MATERIALS INTO SUGAR AND METHOD OF USING THE SAME

(71) Applicant: Alliance Bioenergy Plus Inc., Palm Beach Gardens, FL (US)

(72) Inventors: Benjamin Slager, Delray Beach, FL (US); Peter Cohen, Portland, OR (US)

(73) Assignee: Alliance BioEnergy Plus Inc., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,435

(22) Filed: Mar. 31, 2021

(65) Prior Publication Data

US 2021/0213412 A1 Jul. 15, 2021

Related U.S. Application Data

(63) Continuation of application No. 16/969,087, filed as application No. PCT/US2019/013869 on Jan. 16, 2019, now Pat. No. 10,994,255.

(60) Provisional application No. 62/617,900, filed on Jan. 16, 2018.

(51) Int. Cl.
*B01J 19/00* (2006.01)
*B01J 19/20* (2006.01)
*C13K 1/02* (2006.01)

(52) U.S. Cl.
CPC ....... *B01J 19/0033* (2013.01); *B01J 19/0013* (2013.01); *B01J 19/20* (2013.01); *C13K 1/02* (2013.01); *B01J 2219/00087* (2013.01); *B01J 2219/00162* (2013.01); *B01J 2219/00177* (2013.01); *B01J 2219/00182* (2013.01)

(58) Field of Classification Search
CPC .... B01J 19/0033; B01J 19/0013; B01J 19/20; B01J 2219/00087; B01J 2219/00162; B01J 2219/00177; B01J 2219/00182; B01J 2219/00193; B01J 2219/00229
See application file for complete search history.

(56) References Cited

U.S. PATENT DOCUMENTS 7,896,638 B2 3/2011 Morimoto
8,062,428 B2 11/2011 Blair et al.
8,778,084 B2 7/2014 Nguyen et al.
(Continued)

*Primary Examiner* — Lessanework Seifu
(74) *Attorney, Agent, or Firm* — Eandi Fitzpatrick LLP

(57) ABSTRACT

A device for converting cellulose to sugar has a reaction chamber with a plurality of control components, and a control assembly. The control assembly is operatively connected to the reaction chamber, a drive assembly and control components to transmit and receive interoperability signals. The device has an inlet hopper with a detector, a crusher, an outlet hopper, a sensor assembly, a steam inlet, and a carbon dioxide inlet. The inlet hopper is configured to receive and analyze proportion data of matters in a feedstock and catalyst mixture via the detector. The crusher receives and grinds the mixture from the inlet hopper to induce chemical reaction for producing sugar. The outlet hopper is configured to determine a proportion data of matter in the grinded mixture. The control assembly is configured to determine adjustments need to be performed on the components and drive assembly to optimize the sugar production.

19 Claims, 6 Drawing Sheets

(56) References Cited

U.S. PATENT DOCUMENTS

| | | |
|---|---|---|
| 8,871,739 B2 | 10/2014 | Blair et al. |
| 9,050,603 B2 | 6/2015 | Assmann et al. |
| 9,056,893 B2 | 6/2015 | Paripati et al. |
| 9,267,181 B2 | 2/2016 | Dhepe et al. |
| 9,574,246 B2 | 2/2017 | Nikam et al. |
| 9,937,469 B2 | 4/2018 | Benson et al. |
| 10,155,283 B2 | 12/2018 | Kimura et al. |
| 10,227,623 B2 | 3/2019 | De Silva et al. |
| 2010/0024808 A1 | 2/2010 | Burke et al. |
| 2010/0297705 A1 | 11/2010 | Medoff et al. |
| 2015/0265999 A1 | 9/2015 | Medoff et al. |
| 2018/0193880 A1 | 7/2018 | Dumbaugh |

SYSTEM TO CONVERT CELLULOSIC MATERIALS INTO SUGAR AND METHOD OF USING THE SAME

CROSS-REFERENCE TO RELATED APPLICATIONS

The present utility patent application is Continuation Application of U.S. Non-Provisional patent application Ser. No. 16/969,087 filed Aug. 11, 2020 entitled System to Convert Cellulosic Materials into Sugar and Method of Using the Same, which is itself a United States National Stage application filed under 35 U.S.C. § 371 of International Patent Application No. PCT/US2019/013869 filed on Jan. 16, 2019 entitled System to Convert Cellulosic Materials into Sugar and Method of Using the Same, which claims the priority benefit of U.S. provisional patent application Ser. No. 62/617,900 filed on Jan. 16, 2018, entitled Device to Convert Cellulosic Materials into Sugar and a System and Method of Using the Same, the entirety of each being incorporated herein by reference for all purposes.

STATEMENT REGARDING FEDERALLY SPONSORED RESEARCH OR DEVELOPMENT

Not Applicable

FIELD OF THE INVENTION

The present invention relates generally to hydrolysis of cellulosic materials. More particularly, the present invention relates to certain new and useful advances in devices that can be used to induce hydrolysis to cleave the glyosidic linkage of cellulose to make monomeric sugar with the greatest yield over time, while reducing alternative product formation or monomeric sugar loss; reference being had to the drawings accompanying and forming a part of the same.

BACKGROUND

Cellulose is an organic compound with a general formula $(C_6HioO_5)_n$, a polysaccharide consisting of a linear chain of several hundred to many thousands of β(1,4) linked D-glucose units, joined by an oxygen (ether) linkage to form long molecular chains that are essentially linear. These linkages cause the cellulose to have a high crystallinity and thus a low accessibility to enzymes or acid catalysts. This phenomenon is known as recalcitrance.

Cellulose is an important structural component of the primary cell wall of green plants, many forms of algae and the oomycetes. It occurs in close proximity to hemicellulose and lignin, which together comprise the major components of plant fiber cells. In addition, some species of bacteria secrete it to form biofilms. Naturally formed by plants, cellulose is the most abundant organic polymer on Earth.

Hydrolysis is what the enzymes do. Enzymes are a specific type of catalyst, like liquid or solid acids. Cellulose has many pathways to many products including nanocellulose, microcrystalline cellulose, glucose, many things you can make from glucose including ethanol and the many things you can make from ethanol as a chemical economy.

Hydrolysis, meaning water-cleavage is a reaction involving the breaking of a bond in a molecule using water. Hydrolysis of cellulose yields a mixture of simple reducing sugars, mainly glucose. These hydrolysis products can be converted to ethyl alcohol which can be used as a liquid fuel to replace petroleum, and results in more complete and cleaner combustion, they may also serve as fuel or intermediates in pathways to other fuels. In addition, products of hydrolysis can also be used to manufacture various organic chemicals presently produced from petroleum. In terms of available energy, expressed as the heat of combustion of cellulose or of the glucose product theoretically obtainable therefrom, a pound of cellulose is equivalent to approximately 0.35 lbs. of gasoline or other fuels.

On earth, it has been estimated that roughly $6.45 \times 10^{11}$ tons of carbon are fixed and deposited every year by photosynthesis, out of which half appears in the form of cellulose. In addition, it has been estimated that about ¾ of the approximate of the biomass generated on cultivated lands and grasslands currently contribute to waste production. The utilization of such waste materials for developing alternative sources of fuels, chemicals and other useful products has long been desired. However, attempts to hydrolyze cellulose have not yet succeeded in providing an economically viable method for producing sugars, due primarily to the crystalline structure of cellulose and the presence of lignin therein. The sheer magnitude of this potential source dictates the necessity of improving the methods and systems for cellulose utilization.

Furthermore, in known processes and methods the chemical or thermal stress on the macromolecules, particularly when processing extremely viscous, highly substituted products, is so intense that during conversion macromolecules may be decomposed in the form of a chain scission, which is noticeable in particular by the more or less large decrease in viscosity compared to the starting products. Also, the surfaces of the products treated by the preliminary embrittlement or drying steps become rough. Furthermore, a common feature of known processes is the large amount of energy expended in converting cellulose derivatives after the preliminary drying, embrittlement or compaction.

Therefore, a need exists for an improved device, system and method to convert cellulosic materials into sugar that is cost effective and provides the greatest yield of sugar over time, as will be described in greater detail herein.

SUMMARY OF THE INVENTION

The following summary of the invention is provided in order to ensure a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented following.

To achieve the foregoing and other aspects and in accordance with the purpose of the invention, a device, system and method for the conversion of cellulose in cellulose containing materials into sugar and a system and method for using the same is presented.

The present invention relates to a system, device and method that utilizes a solid-solid reaction to convert cellulose to sugar using at least a set of rollers to achieve optimized sugar output from a feedstock of cellulose containing material. The system, device and method optimize internal conditions using atmospheric equilibrium sensors, cellulose feedstock and solid acid to maximize sugar output whilst lowering wasted energy.

The present system utilizes mixing generally, but specifically micro-mixing to maximize reaction points in the cellulose whilst ensuring the time that the feedstock has to react is increased. Micro-mixing improves reaction site and catalyst interaction and optimizes energetic performance. The rollers are able to be set such that they are fully adjustable so mechanical, temperate, atmospheric, and chemical reaction parameters are controlled. This is to ensure ideal conditions to achieve reaction speed and process efficiency.

Accordingly, the present system provides an efficient and economical method for the utilization of cellulosic materials to produce sugar.

The present system comprises a new and improved device that can create monomeric sugar with high yield over a short time.

The present system also reduces alternative product formation and monomeric sugar loss.

More specifically, the present system is easy and inexpensive to construct and has a smaller footprint more portable than like-kind that can be used in the cellulose to sugar process.

In exemplary embodiments, a device for the conversion of cellulose into sugar and a system and method for using the same is presented. The device is in the form of a mill specifically designed to be used in a cellulose to sugar process.

The device/mill is used in a system for converting cellulose to sugar is presented, the system comprising a reaction chamber comprising a plurality of control components; a control assembly operatively connected to the reaction chamber and to each of the control components, the control components configured to transmit and receive interoperability signals, wherein the plurality of control components comprises a crusher assembly for receiving a mixture of cellulose feedstock and solid acid catalyst, wherein the crusher assembly is configured to grind the mixture under pressure to induce a solid-solid between the cellulose feedstock and the solid acid catalyst chemical reaction to produce sugar, and an outlet hopper having a detector configured to determine a proportion of matter in the grinded mixture delivered by the crusher assembly, wherein the control assembly is configured to determine if reprocessing of the grinded mixture is required, and is so, tune the control components to optimize sugar production.

In one embodiment, the plurality of control components comprises an inlet hopper, a crusher assembly, an outlet hopper, a sensor assembly, a steam inlet, and a carbon dioxide inlet. In one embodiment, the inlet hopper further comprises a detector. In one embodiment, the inlet hopper is configured to receive and analyze a proportion of elements or matter in a feedstock and catalyst mixture. The matter may be comprised of protein, cellulose, starch, monomeric sugar, lignin, ash, water or oil, or any other form of cellulosic matter. The solid acid may be any type of solid acid known now or in the future. In one embodiment, the detector is a NIR detector, but may be any other detector that is able to passively or actively detect observations to determine properties and composition of matter.

In one embodiment, the crusher assembly receives the mixture of feedstock and catalyst from the inlet hopper. The crusher assembly is configured to grind or thereby apply extreme pressure to the mixture to induce a chemical reaction for producing sugar. In one embodiment, the crusher assembly comprises at least one pair of rollers with varying surface conditions. In another embodiment, the crusher assembly comprises at least one pair of intermeshing or interconnecting roller assembly having teeth (e.g., gear teeth). In some embodiments, the crusher assembly comprises multiple sets of intermeshing gears or approximately smooth faced roller assemblies.

The outlet hopper comprises a detector. In one embodiment, the outlet hopper is configured to determine an extent of the reaction and signal the control system (or "assembly") to further tune the conditions of the crusher assembly grinded mixture delivered by the crusher assembly. In this way, the control assembly is configured to determine if reprocessing of the grinded mixture is required.

The sensor assembly is configured to transmit one or more phenomena of the reaction chamber including, but not limited to, pH data, temperature data, oxygen data, moisture data and pressure data to the control assembly. The sensor assembly includes, but not limited to, pH sensor, temperature sensor, oxygen sensor, moisture sensor and pressure sensor.

The steam inlet is configured to regulate a flow of steam in the reaction chamber, and the carbon dioxide inlet configured to regulate a flow of carbon dioxide in the reaction chamber. The carbon dioxide may be substituted for any other substance to prevent oxidation such as nitrogen and argon, or addition of any gas that enhances the reaction by having certain properties or a certain composition.

The device further comprises a mixing apparatus and a feedline. The mixing apparatus is in communication with control assembly configured to mix the feedstock and catalyst. The feedline connecting the mixing apparatus and the inlet hopper to feed the feedstock and catalyst mixture in the reaction chamber.

The device further comprises atmospheric adjustment modules or equalizers such as a vacuum pump, a heater, a pressure valve or pressure pump for a semi-closed system. The pump is configured to create positive or negative pressure in the reaction chamber. The heater is configured to heat the reaction chamber. A heat sink or cooling apparatus is configured to cool the reaction chamber. The device further comprises a return feed line connected to the outlet hopper and the inlet hopper configured to feed the grinded mixture to the reaction chamber for reprocessing. The device further comprises a collection device that is configured to receive the grinded mixture from the outlet hopper.

In one embodiment, a method for converting cellulose to sugar comprises mixing a feedstock and catalyst a mixing apparatus, inputting the feedstock and catalyst mixture into an inlet hopper of a reaction chamber. At another step, proportion data of matter in a feedstock and catalyst mixture is received and analyzed via the at least one detector. At another step, the mixture of feedstock and catalyst is received from the inlet hopper to the crusher assembly to grind the mixture to induce chemical reaction for producing sugar. At another step, the data is recovered of matter in the grinded mixture is determined and delivered by the crusher assembly. At another step, the reprocessing of the grinded mixture is determined at the control system in communication with the reaction chamber and required to reprocess. At another step, the grinded mixture is fed to the reaction chamber for reprocessing via a feed line on requirement of reprocessing. At another further step, the produced sugar is received on reprocessing from the outlet hopper by the collection device.

Other features, advantages, and aspects of the present invention will become more apparent and be more readily understood from the following detailed description, which should be read in conjunction with the accompanying drawings.

DETAILED DESCRIPTION OF THE INVENTION

Figure 1:
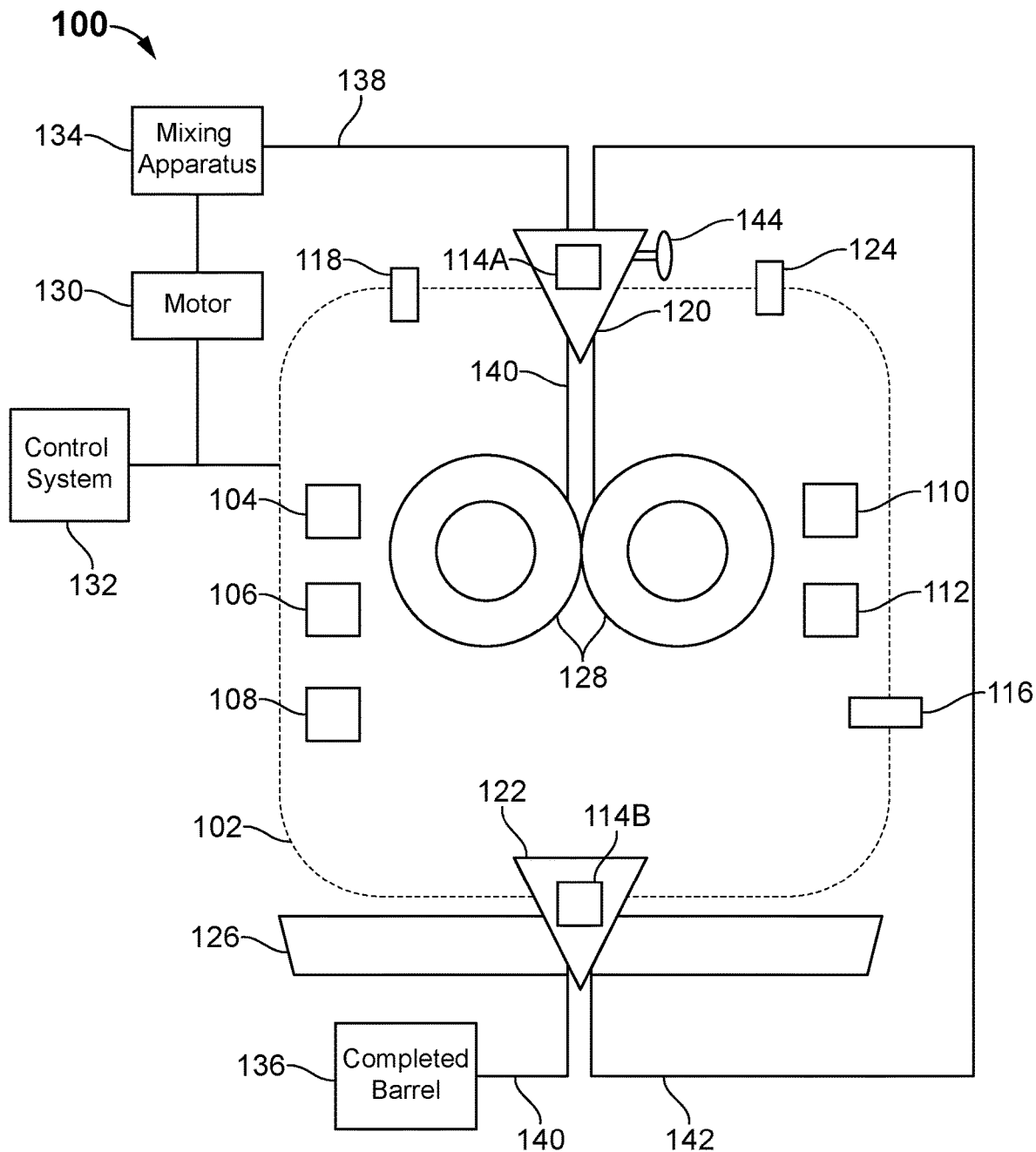
FIG. 1 is a perspective front view of an embodiment showing a system, namely a mill, that can be used in the cellulose to sugar process, in accordance with one embodiment of the present invention.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described are shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

As used herein, "material" or "matter" refers to the material introduced into the mill to be processed as part of the cellulose to sugar process as well as the material that exits the mill after the completion of the process.

By "interaction" it is meant that an interaction between feedstock and the solid acid produce a chemical reaction to form sugar.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be also understood to refer to functional equivalents of such structures. The present invention will now be described in detail with reference to embodiments thereof as illustrated in the accompanying drawings.

Referring now to FIG. 1, a perspective front view of an embodiment showing a system namely a mill, that can be used in the cellulose to sugar process in accordance with one embodiment of the present invention, is presented generally at reference numeral 100. This embodiment 100 illustrates the functional components of the mill in accordance with one embedment of the present invention. The various components of the mill 100 and their role in the cellulose to sugar process will be further described below in relation to FIGS. 1-3. The mill 100 comprises a reaction chamber 102 with a plurality of control components. In one embodiment, the plurality of control components comprises an inlet hopper 120, a crusher assembly 128, an outlet hopper 122, a sensor assembly, a steam inlet 118, and a carbon dioxide inlet 124.

Still referring to FIG. 1, a control system 132 is coupled to a drive assembly 130 and both are coupled to the reaction chamber 102. In one embodiment, the drive assembly 130 includes a motor. In one embodiment, the motor 130 is powered via a power supply. Through being coupled to the reaction chamber 102, the control system 132 is able to communicate and receive information from the various sensors 104-112, vacuum pump 116, heater 126, crusher assembly 128, steam inlet 118, carbon dioxide ($CO^2$) inlet 124 and detectors 114A-114B. Through its interconnectivity, the control system 132 allows for real time monitoring, analyzing and adjusting to ensure that the process is optimized. The foregoing is further discussed herein when describing the other components of the device.

Referring still to FIG. 1, the crusher assembly 128 is configured to induce a chemical reaction in solid phase between the feedstock and the catalyst (e.g., clay). In one embodiment, the crusher assembly 128 may be a single set of approximately smooth rollers (e.g. rounded), but any shape roller may be used so long as it induces appropriate pressure. In another embodiment, the crusher assembly 128 may be set of intermeshing rollers in the form of gears with high hardness. In some embodiments, the crusher assembly 128 may be any mechanism to compress the solids at very high pressure. The crusher assembly 128 is configured to compress or push together the solids at very high pressure and at a predetermined temperature which aids a solid-solid molecular reaction between the feedstock and the hydrous clay to produce or synthesize sugar utilizing a feedstock. In one embodiment, the solids include, but are not limited to, a lignocellulosic biomass and solid acids. In one embodiment, the ratio of the biomass to the solid acid may be, but is not limited to, 1:0.1-10 kg/kg. In one embodiment, the solid acids may be, but are not limited to, kaolin, bentonite, and montmorillonite or any solid acid existing now or in the future.

Still referring to FIG. 1, the drive assembly 130 and control system 132 are also coupled to the mixing apparatus 134, which is where the feedstock and catalyst are mixed; once mixed, the material is sent to the inlet hopper 120 via the feed line 138. Once inside the inlet hopper 120, the detector 114A together with any other necessary sensors or detectors analyzes the matter and calculates information that will be useful in the process such as protein content, cellulose, starch, and monomeric sugar, water, lignin, ash, oil, and mechanical properties. In one embodiment, the detector (114A and 114B) is a NIR detector but may be any detector or sensor that analyze compounds and materials in a mixture. This information will be used to analyze the material to ensure the process performs at the optimal level to ensure consistency and the best yield. In one embodiment, readings from the detector 114A can be utilized by the control system 132 to make adjustments to the speed of the crusher assembly 128 to ensure the process is optimized. Once the material is analyzed inside the inlet hopper 120, then the feed valve 144 will be used to open the inlet hopper 120 so that the material may pass from the inlet hopper 120 down into the feed guide 140, which will guide the material down between the crusher assembly 128 located within the reaction chamber 102. As previously discussed, the crusher assembly 128 is powered via the drive assembly 130 and control system 132 that are coupled to the reaction chamber 102. In one embodiment, the crusher assembly 128 and the drive assembly 130 are connected via a drive shaft. Once the process is completed, the material exits the reaction chamber 102 via the outlet hopper 122. Once in the outlet hopper 122, the detector 114A and 114B together with any other necessary sensors or detectors analyzes the material to determine whether or not it must be passed through the mill again. If it is determined that the material must be ran through again, then the material will be sent via the return feed line 142 back to the inlet hopper 120, where the detector 114A will analyze the material again, whilst determining the adjustments which must be made to the device in order to reprocess the material. Once the process is completed and the material is no longer required to be run through the crusher assembly 128, then it will be sent to the completed collection device 136 via the exit feed line 140. In one embodiment, an outlet valve could be provided at the feed guide 140 or line 142 to control the flow of the material. In one embodiment, a tight seal is provided to the feed guide 140 and feed line 142 to prevent leakages of the material. It is important to note that more than one crusher assembly 128 may be used in the reaction chamber 102.

Still referring to FIG. 1, the inlet hopper 120 and the outlet hopper 122 are coupled to the reaction chamber 102 and are used to introduce the material into the collection device 136 and to evacuate the material out of the collection device 136, respectively. To open and close the inlet hopper 120 so that the material may enter the reaction chamber 102, a feed valve 144 is used. In the present embodiment, the inlet hopper 120 and outlet hopper 122 are operated based upon an atmospheric control system that regulates pressure in the reaction chamber 102 to enhance conveyance of materials in the system. In other embodiments, the inlet hopper 120 and outlet hopper 122 may be controlled via electronic systems and coupled with the control system 132.

Still referring to FIG. 1, a control system 132 is coupled to the drive assembly 130 that is further coupled to the crusher assembly 128 which is further coupled to the reaction chamber 102. The drive assembly 130 must provide enough power and torque required to turn the crusher assembly 128 at a predetermined or optimal revolutions per minute and be able to change speeds and power outputs over time. In embodiments, each of the rollers of the crusher assembly 128 may turn at different revolutions per minute (RPMs) in order to optimize the reaction. In one embodiment, the control system 132 is a processor that reads the sensors 104-112 and automatically responds to predefined parameters. Real time measurements will allow for real time adjustments to ensure the crusher assembly 128 operate in the optimal manner. As an example, the drive assembly 130 and control system 132 may alter the revolutions per minute as needed to adjust the torque and power of the crusher assembly 128 based upon sugar production and responses from the parameter monitoring. In another example, if the temperature sensor 106 sends a reading to the control system 132 that the temperature is outside of a predetermined range, then the control system 132 will send a corresponding signal to the heater 126 to heat the reaction chamber 102.

Still referring to FIG. 1, the mill 100 further comprises a sensor assembly. In one embodiment, the sensor assembly comprises various sensors 104-112, which are coupled to the interior of the reaction chamber 102, which include a pH sensor 104, temperature sensor 106, oxygen sensor 108, moisture sensor 110 and a pressure sensor 112, all of which are described herein in further detail. All of the sensors 104-112 will also be coupled to the control system 132 in order to communicate to the other systems and devices that may be coupled to the reaction chamber 102 to ensure the production of cellulose is at its optimal level, all of which are further described herein. The pH sensor 104 is coupled to the reaction chamber 102 and aids in measuring the effective acidity of the reaction environment. The pH sensor is configured to measure hydrogen ion concentration of the solution which aids in establishing the actual acidity of each site and the number of acid sites. Because hydrolysis is catalyzed by acid sites on the catalyst, a lower pH indicates more acid sites, increasing the changes for hydrolysis to occur. In addition, monitoring the pH levels and assuring certain levels are met will also affect fermentation and/or conversion of the materials loaded into the reaction chamber 102 process. The temperature sensor 106 may be coupled to the reaction chamber 102 and is used to monitor the frictional heat temperature within the reaction chamber 102 to ensure that a high enough temperature is reached to activate the hydrolysis reaction occurring between water and cellulose to make sugar; at the same time, this temperature must also be low enough to avoid reactions that would cause the sugar to degrade.

Still referring to FIG. 1, the oxygen sensor 108 may be coupled to the reaction chamber 102 and is used to monitor oxygen levels within the reaction chamber 102. Because oxygen can cause oxidation of sugar products, it must be removed from the reaction chamber 102 before the cellulose to sugar process can be completed. To accomplish the foregoing, the oxygen sensor 108 works in conjunction with the vacuum pump 116, which is also coupled to the reaction chamber 102, such that if the oxygen sensor 108 detects any oxygen within the reaction chamber 102, then the oxygen sensor 108 will communicate to the vacuum pump 116 via the control system 132, which both the oxygen sensor 108 and vacuum pump 116 are also coupled to, to release such oxygen out of the reaction chamber 102. These sensor/ devices may be referred to herein atmospheric equilibrium sensor/devices work in conjunction with other to optimize the conditions in the mill 100.

Still referring to FIG. 1, the oxygen sensor 108 also works in conjunction with the $CO_2$ inlet 124, which is also coupled to the reaction chamber 102 as well as the control system 132. Thus, if the oxygen sensor 108 detects oxygen in the reaction chamber 102 and communicates to the vacuum outlet 116 to release the same via the control system 132, the carbon dioxide inlet 124 will automatically add protective inert carbon dioxide gas to the reaction chamber 102 in order to maintain a positive $CO_2$ pressure within the reaction chamber 102.

Still referring to FIG. 1, a moisture sensor 110 is coupled to the reaction chamber 102 and is used to monitor the amount of moisture within the reaction chamber 102. In one embodiment of the present invention, moisture acts as a reactant to produce sugar during the cellulose to sugar process and is consumed by the reaction. As sugar is produced the moisture levels in the reaction chamber 102 drops and the moisture localizes to hydrate the more hydroscopic monomeric sugars being produced. Therefore, the moisture sensor 110 is important in the present embodiment to ensure that the moisture levels in the reaction chamber 102 remain at the optimal level for the best reaction. In the present embodiment, the moisture levels may be greater than 0.00% but less than 50% by mass. To ensure the foregoing moisture levels are maintained, a steam inlet 118 is also coupled to the reaction chamber 102 and is used to disperse additional steam into the reaction chamber 102, such that the moisture sensor 110 may communicate via the control system 132 with the steam inlet 118 to disperse additional steam into the reaction chamber 102.

Still referring to FIG. 1, spectrum detectors 114A-114B together with any other necessary sensors or detectors are coupled to the inlet hopper 120 and outlet hopper 122, respectively, and may be used to analyze the compositions as they pass through the hoppers. The detectors 114A-114B together with any other necessary sensors or detectors will provide data on protein content, cellulose, starch, water, monomeric sugar, lignin, ash and oil. In future embodiments, algorithms may be used to automate responses through the control system 134. In one embodiment, the detector 114B coupled to the outlet hopper 122 will determine whether or not the material must be passed through the device again; if the spectrum detector 114B determines it must be passed through again, then the material is returned to the inlet hopper 120 via the return feed line 142. In one embodiment, a feed pump may be provided at the feed line 142 for returning the material to the inlet hopper 120.

Still referring to FIG. 1, a pressure sensor 112 is coupled to the reaction chamber 102 and is used to monitor the pressure within the reaction chamber 102. The pressure required to induce hydrolysis is created by the crusher assembly 128 within the reaction chamber 102, but the pressure in the reaction chamber 102 must be monitored as the pressure may increase or decrease with the changing temperature, requiring $CO^2$ to be added to the reaction chamber 102 via the $CO^2$ inlet 124 in order to maintain the optimal pressure for the reaction.

Still referring to FIG. 1, a heater 126 is coupled to the base of the reaction chamber 102. While the heat required for the cellulose to sugar process to occur mostly comes from the friction created within the reaction chamber 102 during the process, the initial heating of the reaction chamber 102 may be carried out using the heater 126. In other optional embodiments, the cooling process may be carried out using fans along with heat sinks coupled to the reaction chamber or the gears or rollers themselves and controlled via the control system 132. The crusher assembly 128 may also be temperature controlled by either internal heating or cooling elements or external heating and cooling elements.

Figure 2:
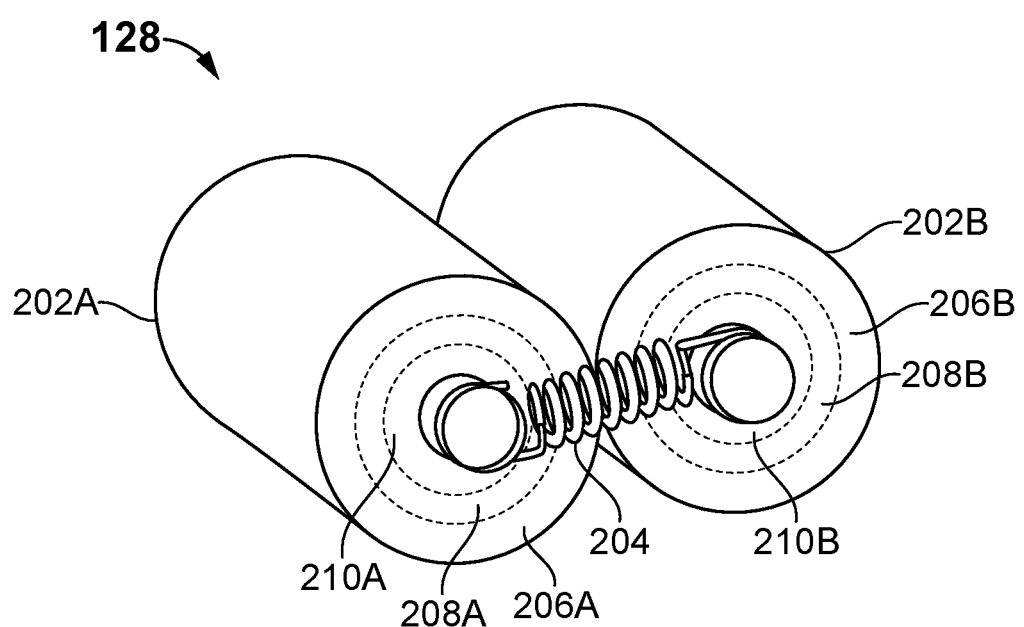
FIG. 2 is a perspective front view of the crusher assembly used within the mill, in accordance with one embodiment of the present invention.

Referring to FIG. 2, a perspective front view of the crusher assembly 128 used within the mill is presented. The crusher assembly 128 comprises two smooth rollers 202A-202B that are pressed together using a spring 204, but any device that is able produce high pressure may be used, for example, hydraulic pistons, screws and any other mechanism to induce pressure. As discussed herein with reference to FIG. 1, the crusher assembly 128 is turned at a rate by the drive assembly 130, which uses the readings from all of the various sensors 104-112 to determine the optimal rate. The rollers 202A and 202B is made of materials that have excellent wear properties to endure long run times at high pressures and in embodiments, are manufactured using various materials having differing hardness.

Each of the rollers 202A and 202B may be formed of material having various degrees of hardness (i.e., layers formed of different materials). In exemplar embodiments, the rollers 202A and 202B have three tiers 206A and 206B, 208A and 208B, and 210A and 210B. The outer tier 206A and 206B have, relatively, the highest hardness. The inner tier 210A and 210B has the least or lowest hardness and the middle tier 208A and 208B have a hardness that falls in between the outer tier 206A and 206B and inner tier 210A and 210B. In operation, having the rollers 202A and 202B being formed of varying hardness optimize the reaction because it increases micro-reactions of the materials. The outer tier 206A and 206B having high hardness ensures that the pressure on the materials remains high and having the middle tier of differing hardness (or softer hardness) ensure that the energy is not lost due to compressive forces in the outer tier being too high, and to preventing compression of the roller material. By varying the pressure over the depth of the roller we can tune the surface and therefore the reaction space, and the energetic efficiency. The number, thickness, aspect ratio, length, diameter, and material type of layers may be optimized depending upon the feedstocks and influences properties of hardness, toughness, compressive strength, and wear resistance.

In one embodiment, the rollers 202A and 202B may be made with gear teeth because they have hard surfaces and induces beneficial compressive residual stresses that effectively lower the load stress, in other embodiments, the rollers may be made of strong metals and alloys, tungsten carbide, diamond, plastics, ceramics and composite materials and the like. In an embodiment, the axels that utilize motive force to spin the rollers may be supplied by an adequate supply of cool, clean and dry lubricant that has adequate viscosity and a high pressure-viscosity coefficient may also be used to help prevent pitting, a fatigue phenomenon that occurs when a fatigue crack initiates either at the surface of the gear tooth or at a small depth below the surface. In one embodiment, the bearings could be, but not limited to, ball bearings. The teeth on the individual gears must also be designed for most efficient wear properties as well as reaction efficiency in regard to contact area and pressure. While only two sets of rollers are shown, there may be an infinite number of rollers in series. Rollers and gears are composed of surfaces for reaction purposes and contact with feed mixture whereas surfaces of the roller or gear support can compose of surfaces that reduce friction and enhance wear resistance and drive surfaces will be enhanced for the use of pulleys, belts, sprockets, chains, couplings, and direct drive attachments.

Figure 3:
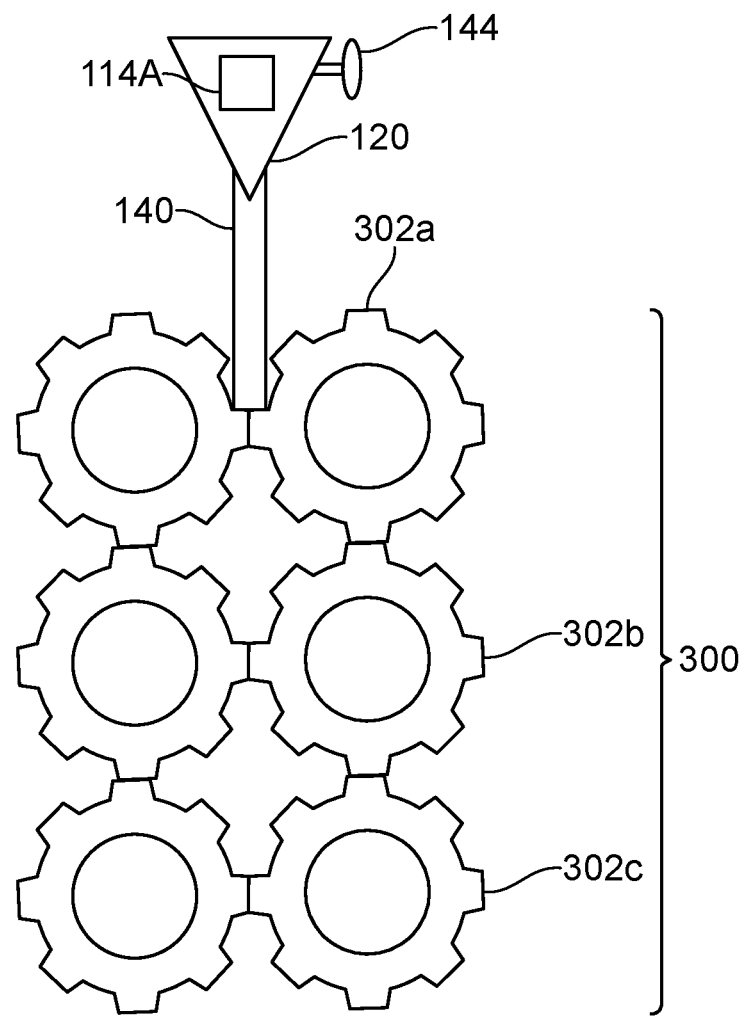
FIG. 3 is a front view of the mill comprising three set of gears in accordance with one embodiment of the present invention.
Figure 4:
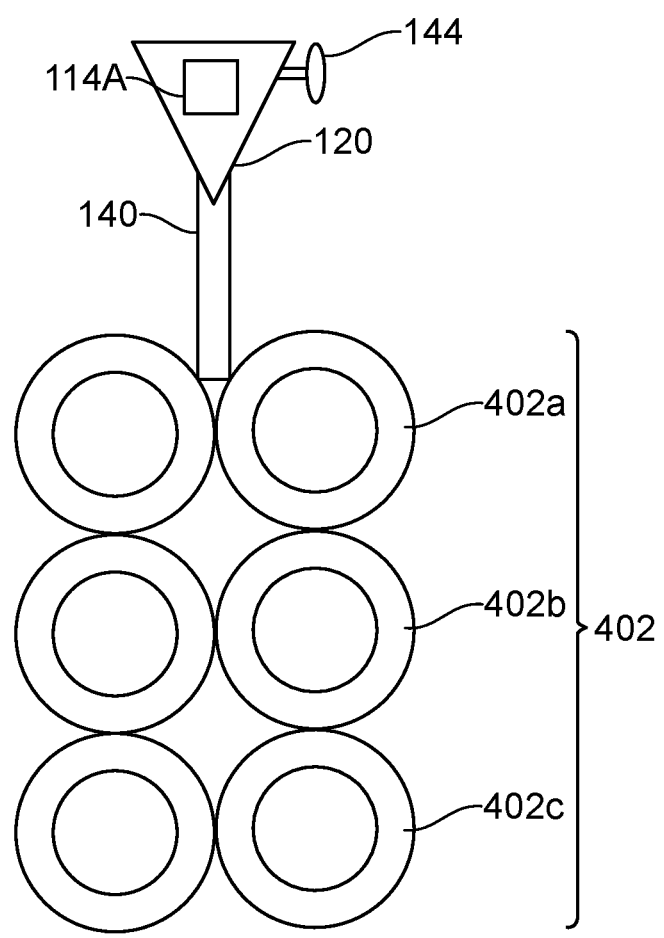
FIG. 4 is a front view of the mill comprising three set of rollers in accordance with one embodiment of the present invention.

Referring to FIG. 3, a front view of a crusher assembly comprise three set geared rollers 300 comprising gears 302a, 302b and 302c. In another embodiment, the set of gears of the crusher assembly are used for efficiently compress or push together the solids at very high pressure and a required temperature which aids a molecular reaction between the feedstock and the hydrous clay to produce or synthesis sugar from the feedstock. The three set of geared rollers 300 may be controlled via the control system 132. In another embodiment, the crusher assembly 128 further comprises three set of smooth rollers 402 comprising 402a, 402b and 402c, as shown FIG. 4. The mixture of feedstock and clay are grabbed by the rollers 146 and pressed together with high force. The three set of rollers 402 may be controlled via the control system 132. Of course, additional sets of smooth roller or geared rollers may be utilized as well depending upon feedstock.

Figure 5:
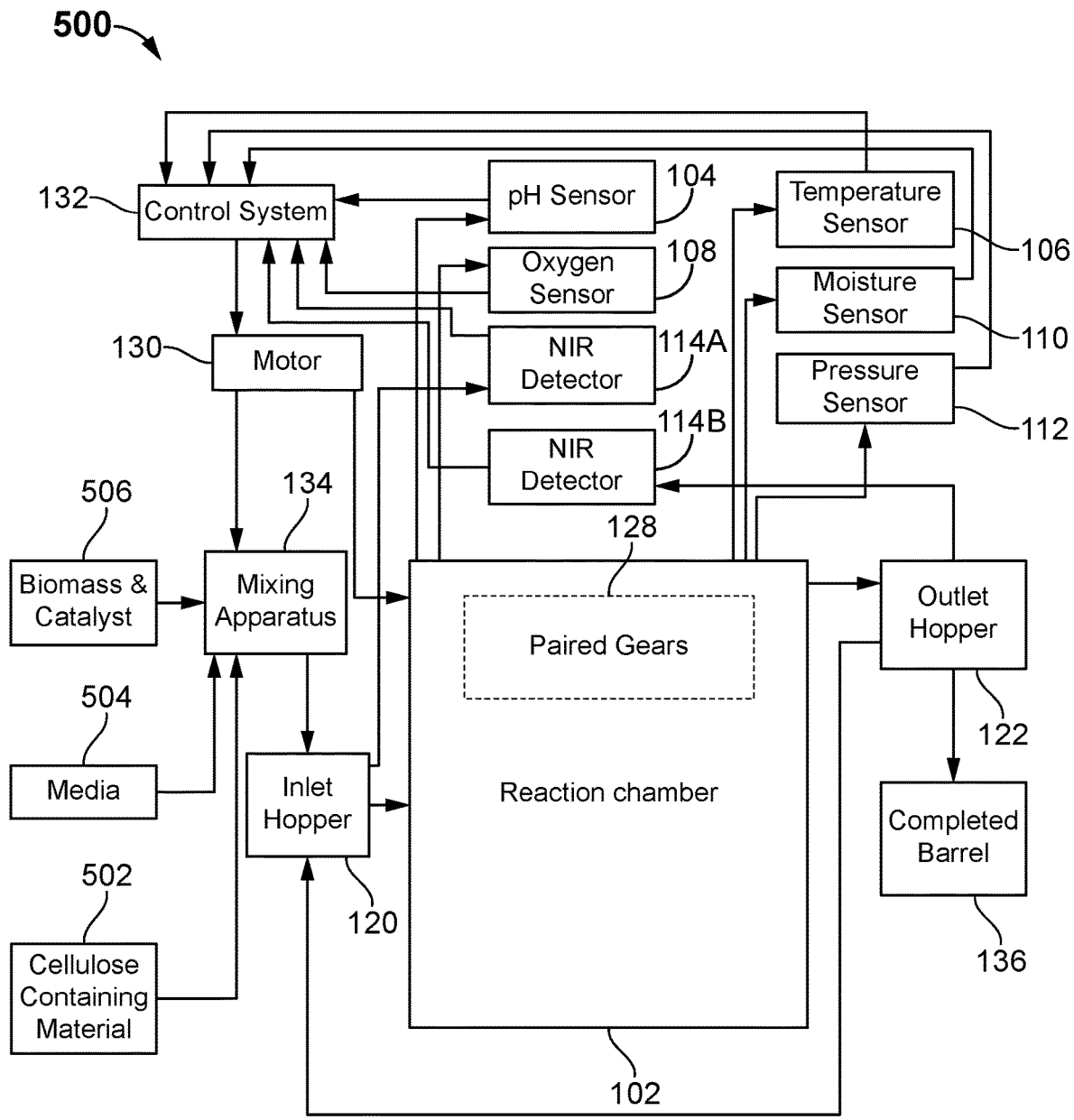
FIG. 5 is a flow diagram of an embodiment showing a system and method to induce hydrolysis to cleave the glyosidic linkage of cellulose to make monomeric sugar through use of the mill in the cellulose to sugar process, in accordance with embodiments of the present invention.

Referring now to FIG. 5, a flow diagram illustrating a system and method to induce hydrolysis to cleave the glyosidic linkage of cellulose to make monomeric sugar through use of the mill in the cellulose to sugar process in accordance with embodiments of the present invention, is presented generally at 500. The method begins with the addition of the cellulose containing material 502, catalyst and biomass 506 and media 504 into the mixing apparatus 134. The cellulose containing material 502 generally includes the cell wall of green plans, many forms of algae and the oomycetes and any plant derived materials. Cellulose containing material 502 may also be obtained from the bark, wood or leaves of plants in addition to plant-based material.

Still referring to FIG. 5, once the material contained within the mixing apparatus 134 is mixed, it is then introduced to the reaction chamber 102 via the inlet hopper 120. The detector 114A coupled to the inlet hopper 120 and monitors the composition of the matter as it passes through the inlet hopper 120. The information gathered by the detector 114A is communicated to the control system 132 for real time analyzing of the matter. The control system 132 automatically reads the sensors 104-112 coupled to the reaction chamber 102 to make any adjustments to the system to ensure for optimal sugar production. For example, the control system 132 may heat the reaction chamber the temperature exceeds a predetermined range or add steam when the moisture is low or speed up or slow down the gears.

Still referring to FIG. 5, at the conclusion of the cellulose to sugar process, the material exits from the reaction chamber 102 via the outlet hopper 122. The detector 114B coupled to the outlet hopper 122 monitors the composition of the material as it exits the reaction chamber 102. If the detector 114B determines that the matter must be further processed, then it will be sent back to the inlet hopper 120 for reprocessing. The information collected by the detectors 114A-114B is sent back to the control system 132 so that it may be analyzed, and adjustments can be made to the system for optimal performance. Once the matter is deemed complete, then it is passed through to the completed collection device 136 and the process is complete. The matters comprise protein, cellulose, water, starch, monomeric sugar, lignin, ash, and oil.

Figure 6:
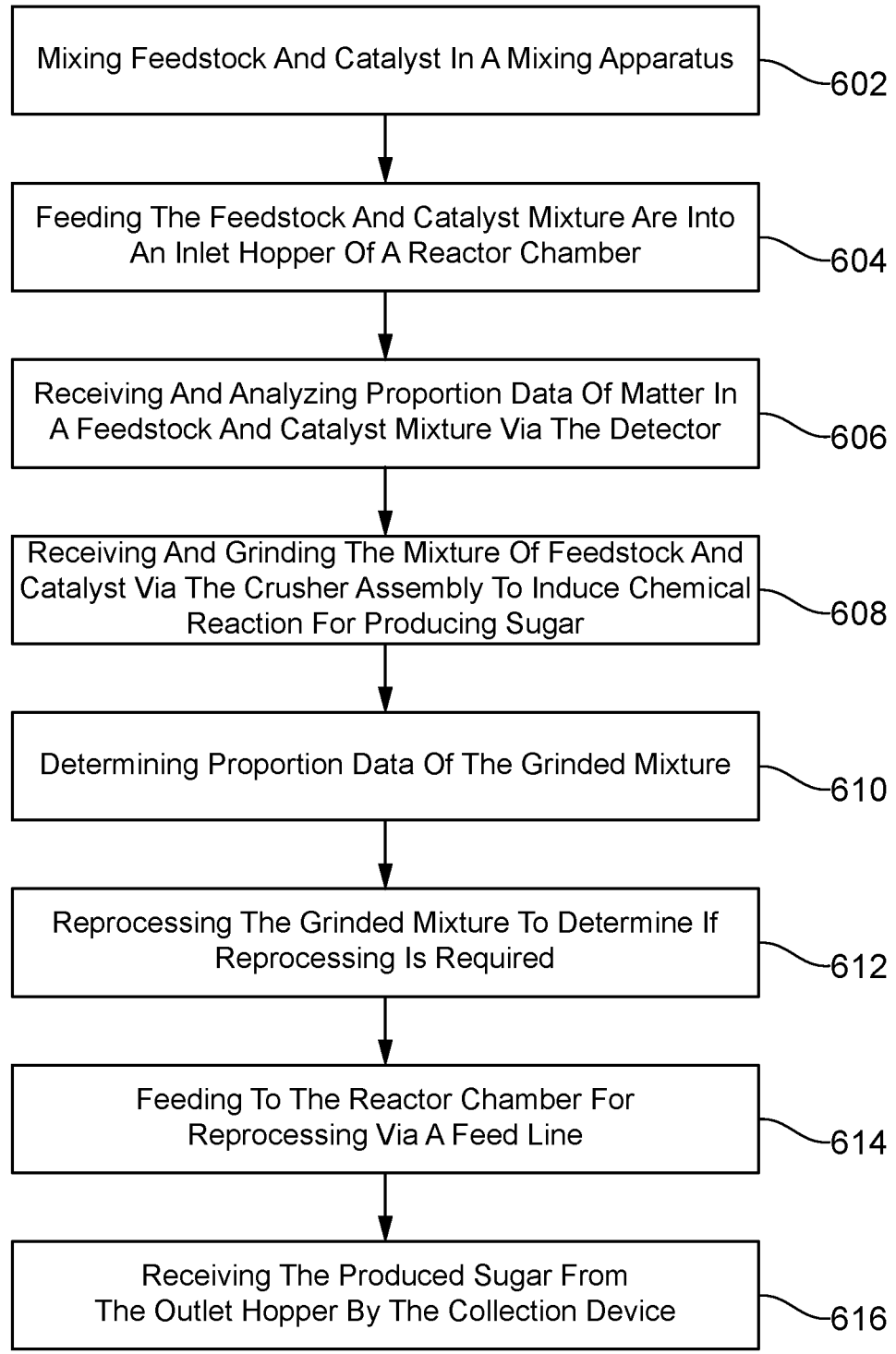
FIG. 6 is a stepwise diagram showing a method to induce hydrolysis to cleave the glyosidic linkage of cellulose to make monomeric sugar through use of the mill in the cellulose to sugar process, in accordance with embodiments of the present invention.

In one embodiment, a method for converting cellulose to sugar is provided and shown in a step-wise diagram at FIG. 6. The method comprises, at step 602 a feedstock and catalyst are mixed at a mixing apparatus. At step 604, the feedstock and catalyst mixture are fed into an inlet hopper of a reaction chamber. At step 606, proportion data of matter in a feedstock and catalyst mixture is received and analyzed via the detector. At step 608, the mixture of feedstock and catalyst is received from the inlet hopper to the crusher assembly to grind the mixture to induce chemical reaction for producing sugar. At step 610, the proportion data of matter in the grinded mixture is determined and delivered by the crusher assembly. At step 612, the reprocessing of the grinded mixture is determined at the control system in communication with the reaction chamber and required to reprocess. At step 614, the grinded mixture is fed into the reaction chamber for reprocessing via a feed line on requirement of reprocessing. At step 616, the produced sugar is received on reprocessing from the outlet hopper by the collection device.

Specific configurations and arrangements of the invention, discussed above with reference to the accompanying drawing, are for illustrative purposes only. Other configurations and arrangements that are within the purview of a skilled artisan can be made, used, or sold without departing from the spirit and scope of the invention. For example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures.

While the present invention has been described in connection with what are presently considered to be the most practical and preferred embodiments, it is to be understood that the present invention is not limited to these herein disclosed embodiments. Rather, the present invention is intended to include the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having" and "with" as used herein are to be interpreted broadly and comprehensively, and are not limited to any physical interconnection. Moreover, any embodiments disclosed herein are not to be interpreted as the only possible embodiments. Rather, modifications and other embodiments are intended to be included within the scope of the appended claims.

We claim:

1. A system for converting cellulosic feedstock to sugar comprising:
   a reaction chamber;
   a crusher assembly configured to receive a mixture of the cellulose feedstock and a solid acid catalyst, wherein the crusher assembly is configured to grind the mixture under pressure to induce a solid-solid interaction between the cellulosic feedstock and the solid acid catalyst to induce a chemical reaction to produce a grinded mixture and sugar, wherein the crusher assembly comprises rollers;
   a steam inlet coupled to the reaction chamber, wherein the steam inlet is configured to regulate a flow of a steam in the reaction chamber;

a carbon dioxide inlet coupled to the reaction chamber, wherein the carbon dioxide inlet is configured to regulate a flow of carbon dioxide in the reaction chamber; and a vacuum pump coupled to the reaction chamber, wherein the vacuum pump is configured to release gas from the reaction chamber.

2. The system of claim 1, further comprising an outlet hopper configured to release an output of reaction materials.

3. The system of claim 1, wherein the rollers comprise a pair of rollers, wherein the rollers comprise a plurality of tiers, wherein the plurality of tiers comprise an outer tier, a middle tier, and an inner tier, and wherein each of the plurality of tiers are formed of different materials, each of the materials have different hardness.

4. The system of claim 3, wherein the outer tier has, relatively, a highest hardness, the inner tier has, relatively, a lowest hardness and the middle tier has, relatively, a hardness that is in between the highest hardness of the outer tier and the lowest hardness of the inner tier.

5. The system of claim 1, further comprising an inlet hopper having a detector configured to analyze proportion data of types of matter in the feedstock and the solid acid catalyst.

6. The system of claim 1, further comprising:
a feedline coupled to the inlet hopper and a mixing apparatus, wherein the feedline is configured to feed the feedstock and catalyst into the reaction chamber.

7. The system of claim 1, wherein the crusher assembly comprises at least one pair of roller assemblies.

8. The system of claim 1, wherein the crusher assembly comprises pairs of intermeshing gear assemblies or roller assemblies.

9. The system of claim 6, further comprises a drive assembly in communication the reaction chamber and the mixing apparatus.

10. The system of claim 1, further comprising a pressure pump configured to create pressure, negative or positive, in the reaction chamber.

11. The system of claim 1, further comprises a heater configured to heat the reaction chamber.

12. The system of claim 1, further comprising a heat sink, cooling apparatus, or a combination thereof, configured to cool the reaction chamber.

13. The system of claim 2, further comprising a return feed line connecting the outlet hopper and the inlet hopper, wherein the return feed line is configured to feed the grinded mixture to the reaction chamber for reprocessing.

14. The system of claim 2, wherein the outlet hopper comprises a detector configured to determine a proportion of matter in the grinded mixture delivered by the crusher assembly, wherein a control assembly is configured to determine if reprocessing of the grinded mixture is required, and if so, tune the control components to optimize sugar production.

15. The system of claim 2, further comprising a sensor assembly comprising a pH sensor, temperature sensor, oxygen sensor, moisture sensor, pressure sensor, or any combination thereof.

16. The system of claim 2, further comprising a collection device configured to receive the grinded mixture from the outlet hopper.

17. The system of claim 1, wherein the feedstock has a biomass, and wherein a ratio of the biomass to the solid acid is 1:0.1-10 kg/kg; and wherein the solid acids comprise kaolin, bentonite, and montmorillonite.

18. A method for converting cellulose to sugar comprising:
mixing a cellulose feedstock and solid acid catalyst at a mixing apparatus;
feeding the feedstock and catalyst mixture into an inlet hopper of a reaction chamber;
receiving the mixture of feedstock and catalyst from the inlet hopper;
grinding the mixture under pressure in a crusher assembly to induce a solid-solid chemical reaction between the cellulose feedstock and the solid acid catalyst to produce sugar, wherein the crusher assembly is driven by a drive assembly and the crusher assembly comprises rollers; and
receiving the produced sugar for reprocessing from an outlet hopper by a collection device.

19. The method of claim 18, wherein the crusher assembly comprises a pair of rollers, wherein the rollers comprise a plurality of tiers, wherein the plurality of tiers comprises an outer tier, a middle tier, and an inner tier, and wherein each of the plurality of tiers are formed of different materials, and wherein each of the materials have different hardness.

* * * * *